United States Patent
Tiwari et al.

(10) Patent No.: US 9,648,505 B2
(45) Date of Patent: May 9, 2017

(54) BI-DIRECTIONAL LINK MARGIN ESTABLISHMENT FOR WIRELESS EMBEDDED SYSTEMS

(75) Inventors: Ankit Tiwari, Sturbridge, CT (US); Luiz Fernando Huet de Bacellar, Glastonbury, CT (US)

(73) Assignee: UTC FIRE & SECURITY CORPORATION, Farmington, CT (US)

(*) Notice: Subject to any disclaimer, the term of this patent is extended or adjusted under 35 U.S.C. 154(b) by 450 days.

(21) Appl. No.: 13/877,741

(22) PCT Filed: Oct. 5, 2010

(86) PCT No.: PCT/US2010/051390
§ 371 (c)(1),
(2), (4) Date: Apr. 4, 2013

(87) PCT Pub. No.: WO2012/047198
PCT Pub. Date: Apr. 12, 2012

(65) Prior Publication Data
US 2013/0194959 A1    Aug. 1, 2013

(51) Int. Cl.
*H04W 24/00* (2009.01)
*H04B 17/309* (2015.01)
*H04B 17/318* (2015.01)

(52) U.S. Cl.
CPC .......... *H04W 24/00* (2013.01); *H04B 17/309* (2015.01); *H04B 17/318* (2015.01)

(58) Field of Classification Search
CPC  H04B 17/0042; H04B 17/309; H04B 17/318; H04B 17/0057; H04W 24/00;
(Continued)

(56) References Cited

U.S. PATENT DOCUMENTS

| 6,754,488 B1* | 6/2004 | Won et al. ............ 455/424 |
| 7,395,058 B1 | 7/2008 | Kalofonos et al. |

(Continued)

FOREIGN PATENT DOCUMENTS

| CN | 1592245 A | 3/2005 |
| CN | 1684441 A1 | 10/2005 |

(Continued)

OTHER PUBLICATIONS

"Adaptive Transmit Power Control Based on Signal Strength and Frame Loss Measurements for WLANs," Hariharasudhan Viswanathan, Master of Science Thesis, Rutgers University, New Brunswick, NJ, Oct. 2009, pp. 1-58.*

(Continued)

*Primary Examiner* — Charles C Jiang
*Assistant Examiner* — Rose Clark
(74) *Attorney, Agent, or Firm* — Cantor Colburn LLP

(57) ABSTRACT

A method for bi-directional link margin establishment includes sending a first link margin exchange packet by a wireless end point (WEP) to a wireless access point (WAP); measuring an uplink signal strength of the first packet; sending to the WEP a second packet comprising the measured uplink signal strength of the first packet; measuring a downlink signal strength of the second packet; calculating an uplink link margin based on the uplink signal strength from the second packet; sending to the WAP a third packet comprising the measured downlink signal strength of the second packet and the calculated uplink link margin; measuring the uplink signal strength of the third packet; calculating a downlink link margin based on the downlink signal strength from the third packet; and sending to the WEP a fourth packet comprising the measured uplink signal strength of the third packet and the calculated downlink link margin.

17 Claims, 4 Drawing Sheets

(58) Field of Classification Search
CPC ... H04W 52/241; H04W 28/18; H04W 52/46;
H04W 52/50; H04W 52/245; H04W
52/0225; H04W 80/00; H04W 28/06;
H04W 52/0212; H04W 52/0245; H04W
84/12; H04W 24/02; H04W 24/10; H04W
24/08; H04W 40/12; H04W 40/16; H04W
52/0229; H04W 72/02; H04W 76/025;
H04W 76/045; H04L 1/0025; H04L
1/1671; H04L 1/0036; H04L 1/24; H04L
5/1438; H04L 69/16; H04L 69/163; H04L
5/0057; G07B 15/063; G07B 15/00;
G07B 15/02
USPC ....... 370/252, 465, 329, 235, 328, 310, 338,
370/349; 455/423, 424, 425, 115.1
See application file for complete search history.

(56) References Cited

U.S. PATENT DOCUMENTS

| | | | |
|---|---|---|---|
| 2002/0172186 A1 | 11/2002 | Larsson | |
| 2003/0212941 A1* | 11/2003 | Gillies | H04L 12/2697 714/726 |
| 2004/0102192 A1* | 5/2004 | Serceki | 455/434 |
| 2005/0059422 A1* | 3/2005 | Rudolf et al. | 455/522 |
| 2005/0064870 A1* | 3/2005 | Gabara et al. | 455/438 |
| 2005/0122912 A1 | 6/2005 | Jeon et al. | |
| 2005/0128970 A1 | 6/2005 | Tsien et al. | |
| 2006/0040619 A1* | 2/2006 | Cho et al. | 455/69 |
| 2006/0135066 A1* | 6/2006 | Banerjea | H04W 48/20 455/41.2 |
| 2007/0075839 A1* | 4/2007 | Ho | G07B 15/063 340/10.2 |
| 2007/0082677 A1* | 4/2007 | Hart et al. | 455/456.1 |
| 2007/0197206 A1* | 8/2007 | Olson et al. | 455/423 |
| 2008/0095058 A1* | 4/2008 | Dalmases | H04L 45/00 370/237 |
| 2009/0082034 A1* | 3/2009 | Gray et al. | 455/456.1 |
| 2010/0061272 A1* | 3/2010 | Veillette | H04L 45/34 370/254 |
| 2010/0062722 A1* | 3/2010 | Dykema | H04B 17/327 455/67.11 |
| 2010/0091669 A1* | 4/2010 | Liu et al. | 370/252 |
| 2010/0233975 A1* | 9/2010 | Wu | H04W 52/52 455/115.1 |
| 2010/0237998 A1* | 9/2010 | Kohli | G07B 15/063 340/10.1 |

FOREIGN PATENT DOCUMENTS

| | | |
|---|---|---|
| EP | 1587221 A2 | 10/2005 |
| WO | 2005046134 A1 | 5/2005 |
| WO | 2010027343 A1 | 3/2010 |
| WO | 2012047198 A1 | 4/2012 |

OTHER PUBLICATIONS

International Search Report of the International Searching Authority for International Application No. PCT/US2010/051390, International Filing Date: Oct. 5, 2010; mailed Jul. 28, 2011; 5 pages.
Written Opinion of the International Searching Authority for International Application No. PCT/US2010/051390; International Filing Date: Oct. 5, 2010; mailed Jul. 28, 2011; 4 pages.
European Search Report for application EP1-858221 dated Feb. 1, 2016, 7 pages.
Second Chinese Office Action and search report for application CN 201080069459.7, dated May 5, 2016, 19 pages.

* cited by examiner

BI-DIRECTIONAL LINK MARGIN ESTABLISHMENT FOR WIRELESS EMBEDDED SYSTEMS

CROSS REFERENCE TO RELATED APPLICATION

This application is a US national stage application under 35 U.S.C. §371 of PCT/US2010/051390, filed on Oct. 5, 2010, which is herein incorporated by reference in its entirety.

FIELD OF INVENTION

The subject matter disclosed herein relates generally to the field of network formation in wireless embedded systems.

DESCRIPTION OF RELATED ART

Unreliable network operation is a major impediment to the adoption of wireless embedded systems, which may be used various application such as security or safety systems. In a safety or security application, timely and reliable message delivery is crucial for providing the basic system functionality. Currently, during wireless system installation, installers ensure that the installed wireless devices have connectivity with a central control panel or server. However, radio frequency (RF) signals may experience fading (i.e. propagation loss) as the medium deviates over time. So even though a wireless device may have connectivity to the central server during installation, the device may not continue to have similar connectivity in the future, as there may be after-installation site variations, for example mounting of cabinets around the wireless device that may further change the wireless propagation characteristics.

In order for a security or safety network to operate unattended for years after installation, it is desirable to develop techniques for robust network installation that maintain the required quality of service over the time.

BRIEF SUMMARY

According to one aspect of the invention, a method for bi-directional link margin establishment in a wireless embedded system, the wireless embedded system comprising a wireless end point (WEP) and a wireless access point (WAP) includes sending a first link margin exchange packet by the WEP to the WAP; measuring by the WAP an uplink signal strength of the first link margin exchange packet; sending by the WAP to the WEP a second link margin exchange packet comprising the measured uplink signal strength of the first link margin exchange packet; measuring by the WEP a downlink signal strength of the second link margin exchange packet; calculating by the WEP an uplink link margin based on the uplink signal strength from the second link margin exchange packet; sending by the WEP to the WAP a third link margin exchange packet comprising the measured downlink signal strength of the second link margin exchange packet and the calculated uplink link margin; measuring by the WAP the uplink signal strength of the third link margin exchange packet; calculating by the WAP a downlink link margin based on the downlink signal strength from the third link margin exchange packet; and sending by the WAP to the WEP a fourth link margin exchange packet comprising the measured uplink signal strength of the third link margin exchange packet and the calculated downlink link margin.

According to another aspect of the invention, a wireless end point (WEP) is configured to send to a wireless access point (WAP) a first link margin exchange packet; receive from the WAP a second link margin exchange packet comprising a measured uplink signal strength of the first link margin exchange packet; measure a downlink signal strength of the second link margin exchange packet; calculate an uplink link margin based on the uplink signal strength from the second link margin exchange packet; and send to the WAP a third link margin exchange packet comprising the measured downlink signal strength of the second link margin exchange packet and the calculated uplink link margin.

According to another aspect of the invention, a wireless access point (WAP) is configured to receive from a wireless end point (WEP) a first link margin exchange packet; measure an uplink signal strength of the first link margin exchange packet; send to the WEP a second link margin exchange packet comprising the measured uplink signal strength of the first link margin exchange packet; receive from the WEP a third link margin exchange packet comprising a measured downlink signal strength of the second link margin exchange packet and a calculated uplink link margin; measure the uplink signal strength of the third link margin exchange packet; calculate a downlink link margin based on the downlink signal strength from the third link margin exchange packet; and send to the WEP a fourth link margin exchange packet comprising the measured uplink signal strength of the third link margin exchange packet and the calculated downlink link margin.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for bi-directional link margin establishment are provided, with exemplary embodiments being discussed below in detail. The bi-directional link margin establishment procedure ensures that a wireless device has sufficient system gain at installation to accommodate for variations in propagation loss that may occur over the time after installation. Bi-directional link margin establishment may provide reliable network operation over time by specifically attacking the root cause of the variability in reliability. RF communication channels may be asymmetric and hence have different propagation characteristics in the two directions of communication (uplink or downlink). The bi-directional link margin establishment ensures reliable communication in both directions.

Figure 1:
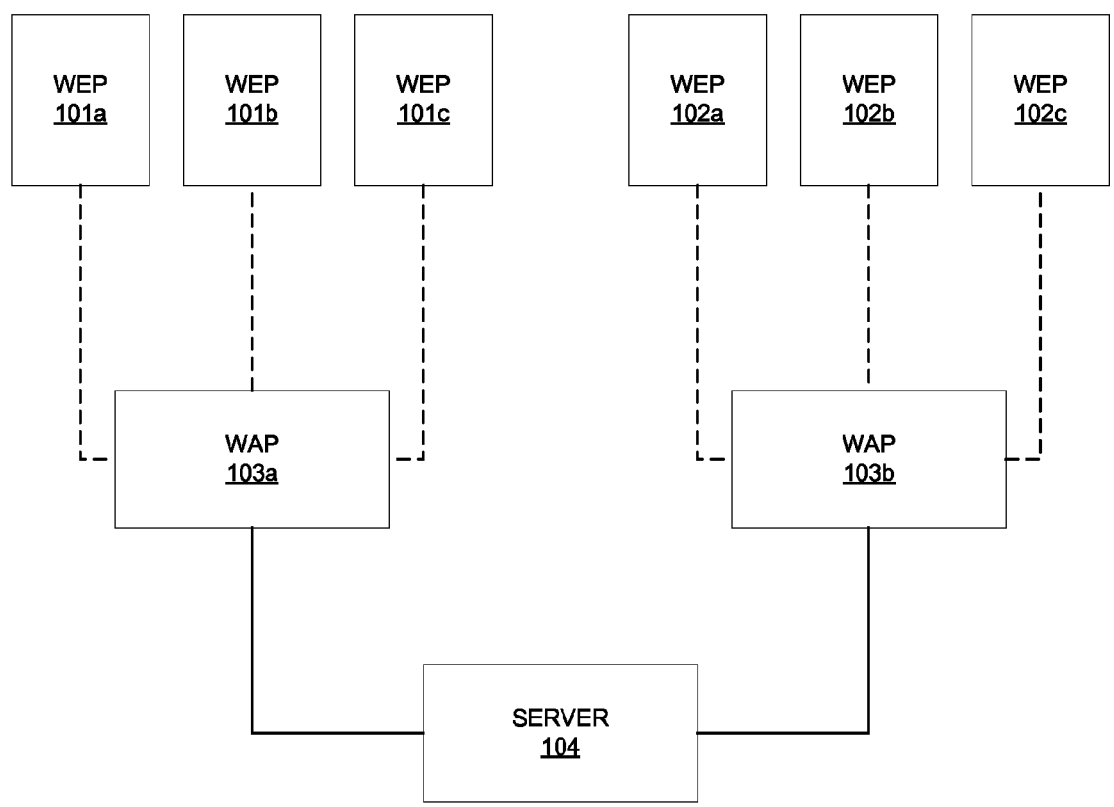
FIG. 1 illustrates an embodiment of a wireless embedded system.

FIG. 1 illustrates an embodiment of a wireless embedded system 100 comprising WEPs 101*a-c* and 102*a-c*. WEPs 101*a-c* and 102*a-c* are in wireless communication with WAPs 103*a* and 103*b*, respectively. WEPs 101*a-c* and WAP 103*a* form a first wireless cluster, and WEPs 102*a-c* and WAP 103*b* form a second wireless cluster. The first wireless cluster and the second wireless cluster may operate on different channels. WAPs 103*a-b* are in communication with server 104. WEPs 101*a-c* and 102*a-c* may be battery powered in some embodiments, and WAPs 103*a-b* may be line powered in some embodiments. WEPs 101*a-c* and 102*a-c* and WAPs 103*a-b* are shown for illustrative purposes only; a wireless embedded system may comprise any appropriate number of WAPs, which may be in communication with any appropriate number of WEPs. System 100 may coexist with any number and type of other wireless devices (not shown)

Figure 2:
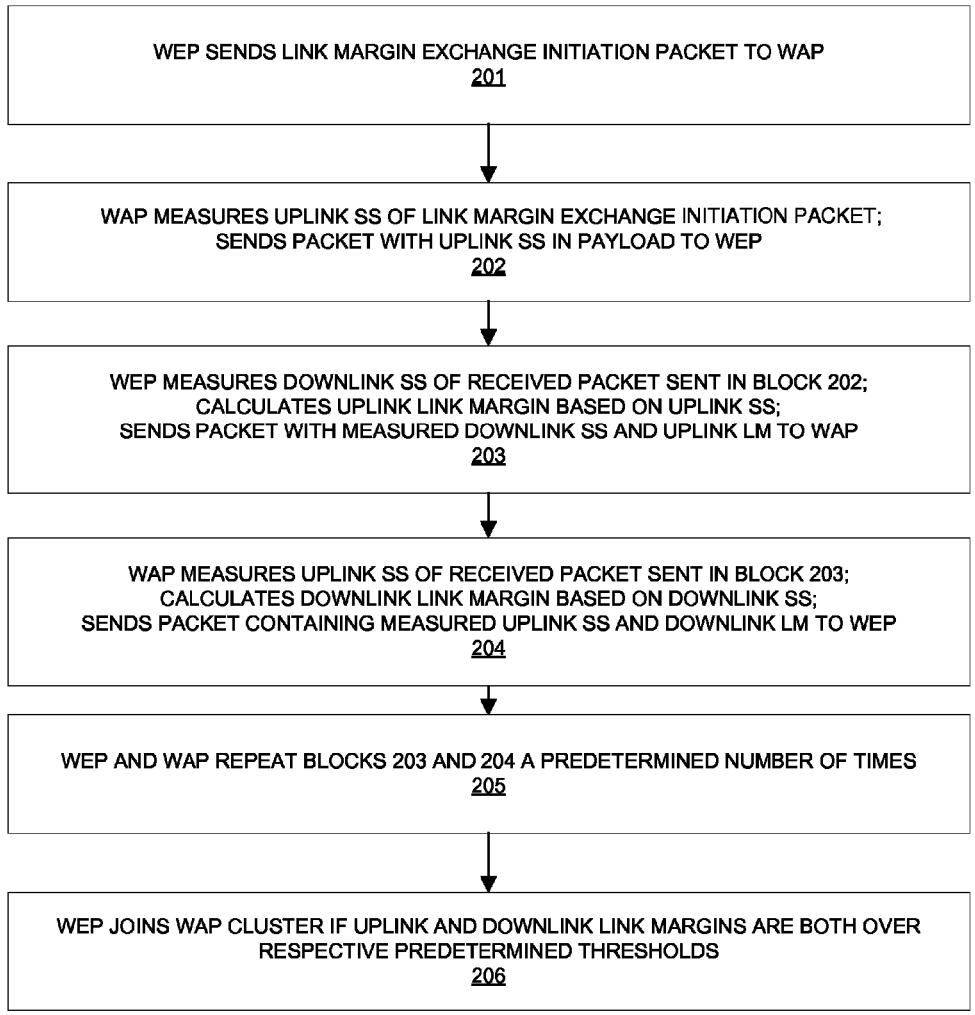
FIG. 2 illustrates an embodiment of a method for bi-directional link margin establishment.
Figure 3:
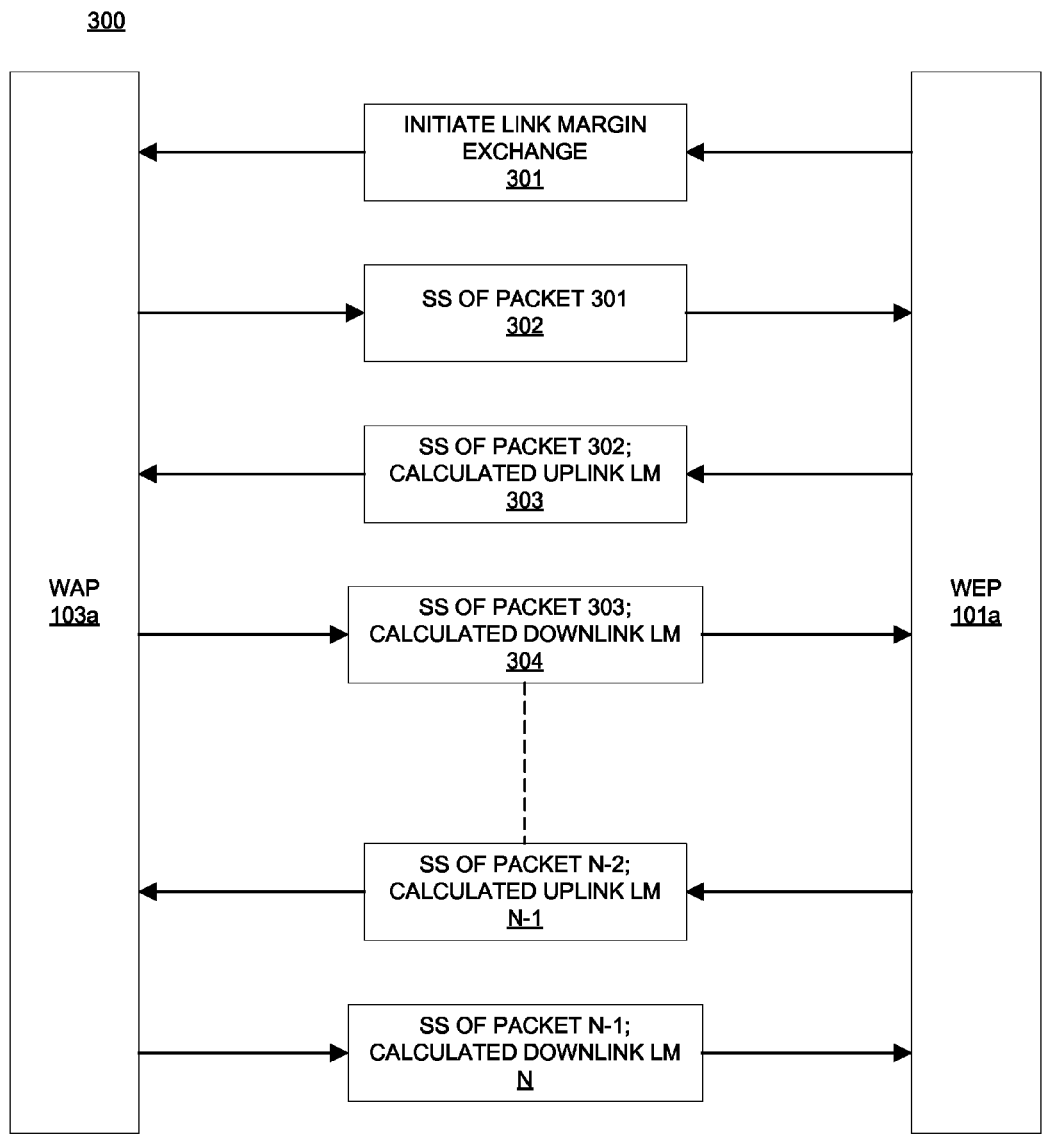
FIG. 3 illustrates an embodiment of packets exchanged in bi-directional link margin establishment.

During the installation of system 100, first one or more WAPs (such as WAPs 103*a-b*) are installed and commissioned. Then, when a WEP (such as any of WEPs 101*a-c* or 102*a-c*) is installed, commissioned, and powered up, the WEP searches for a WAP. Once the WEP finds a WAP, the WEP initiates bi-directional link margin establishment by exchanging link margin messages with the WAP that allow the WEP and the WAP to calculate the link margin for both uplink communication (from WEP to WAP) and downlink communication (from WAP to WEP). FIG. 2 illustrates an embodiment of a method 200 for bi-directional link margin establishment; FIG. 2 is discussed with reference to FIG. 3, which illustrates an embodiment of a series of packets that may be exchanged between a WAP and a WEP in the execution of bi-directional link margin establishment method 200. FIG. 3 shows WAP 103*a* and WEP 101*a* exchanging link margin messages for illustrative purposes only; the messages shown in FIG. 3 may be exchanged by any WAP and WEP. First, in block 201, the WEP 101*a* initiates the link margin exchange by sending a first link margin packet 301 to the WAP 103*a*. Then, in block 202, the WAP 103*a*, on receiving the packet 301 from the WEP 101*a*, measures the received uplink strength of the packet 301, and sends back the measured uplink signal strength as a payload of link margin packet 302 to the WEP 101*a*. In block 203, when the WEP 101*a* receives packet 302, the WEP 101*a* measures and stores the received downlink signal strength of the received packet 302. The WEP 101*a* also uses the uplink signal strength, received in the payload of packet 302, to calculate the uplink link margin. The WEP 101*a* then sends link margin packet 303, with a payload comprising the measured downlink signal strength of packet 302 and the calculated uplink link margin, to the WAP 103*a*. In block 204, the WAP 103*a* measures and stores the uplink signal strength of received packet 303, and calculates the downlink link margin using the downlink signal strength received in the payload of packet 303. The WAP 103*a* then sends link margin packet 304, with a payload comprising the measured uplink signal strength of packet 303 and the calculated downlink link margin, to the WEP 101*a*. At this point, both the WEP 101*a* and the WAP 103*a* have the link margin information for both uplink and downlink communication. In block 205, the WAP 103*a* and the WEP 101*a* may then continue to exchange link margin packets (i.e., repeating blocks 203 and 204) a predetermined number of times, as illustrated by link margin packets N−1 and N of FIG. 3. The exchanged link margin packets comprise the signal strength of the previous received packet and calculated uplink or downlink link margin information in the payload. The WEP 101*a* and WAP 103*a* accumulate the link margin measurements over these packet exchange, allowing for refinement of the link margin measurements. In a preferred embodiment, at least 20 total link margin packets may be exchanged between WEP 101*a* and WAP 103*a*. In block 206, at the end of the exchange, both the WEP 101*a* and WAP 103*a* have the refined uplink and downlink link margin information, determined over the course of the link margin packet exchange, and the WEP 101*a* and WAP 103*a* may determine whether to proceed with the WEP 101*a* joining the cluster of the WAP 103*a*. If either of the uplink or downlink link margins is below a defined threshold, the WEP 101*a* may not join the cluster of WAP 103*a*.

A WEP may provide visual indications to an installer throughout the link margin establishment procedure, allowing the installer to determine whether the link margin is excellent, good or insufficient, and thereby determine an appropriate physical location for the WEP. In a preferred embodiment, the WEP may visually indicate for each received link margin packet if the link margin is good or insufficient, which may help an installer to determine how to fix the problem of a WEP not joining a WAP because of insufficient link margin.

A WEP and WAP may operate in an ad-hoc link margin mode, where the WEP performs the link margin exchange with a WAP that has not yet been commissioned, and before installation of the central server 104. In ad-hoc link margin mode, the installer may first put the WAP in the ad-hoc link margin mode and assign an association code to the WAP. Then the ad-hoc link margin mode is enabled on the WEP, and the same association code is assigned to the WEP. The WEP then performs the link margin establishment exchange illustrated in method 200 with the WAP having the matching association code. The association code may be assigned in various ways, including but not limited to an on-board dip switch, or a computer-based application. The ad-hoc link margin establishment may also be performed without assigning an association code to either of the WAP or the WEP. In this case, the installer may ensure that only one WAP in the system 100 is in the ad-hoc mode at any given time, so as to avoid multiple WAPs responding to the link margin packets sent by the WEP. A WEP may also be put in real-time link margin mode, and physically moved around the installation site by the installer to find an appropriate location with good uplink and downlink link margin measurements. In this mode, the link margin calculations are continuously performed until the mode is terminated and a visual indication of success or failure is provided by the WEP. The ad-hoc link margin mode allows installation of the individual wireless clusters without requiring the central server 104 to be in place.

Figure 4:
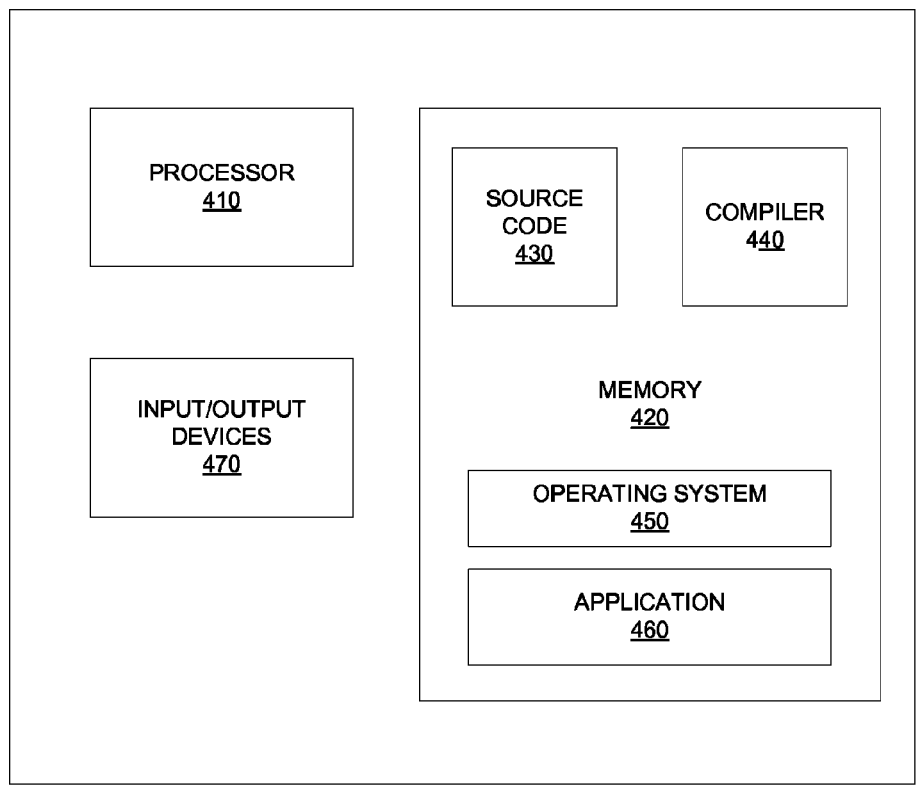
FIG. 4 illustrates an embodiment of a computer that may be used in conjunction with systems and methods for bi-directional link margin establishment.

FIG. 4 illustrates an example of a computer 400 which may be utilized by exemplary embodiments of a method for bi-directional link margin establishment as embodied in software. Various operations discussed above may utilize the capabilities of the computer 400. One or more of the capabilities of the computer 400 may be incorporated in any element, module, application, and/or component discussed herein, including the WEPs and WAPs.

The computer 400 includes, but is not limited to, embedded microprocessor based hardware modules, PCs, workstations, laptops, PDAs, palm devices, servers, storages, and the like. Generally, in terms of hardware architecture, the computer 400 may include one or more processors 410, memory 420, and one or more input and/or output (I/O) devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a digital signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. The software in memory 420 may also be a single source code that incorporates required applications without any O/S in some embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include determination of both uplink and downlink link margin during installation of a wireless embedded system, which may be used to ensure good communication in both directions.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for bi-directional link margin establishment in a wireless embedded system, the wireless embedded system comprising a wireless end point (WEP) and a wireless access point (WAP), the method comprising:
    sending a first link margin exchange packet by the WEP to the WAP;
    measuring by the WAP an uplink signal strength of the first link margin exchange packet;
    sending by the WAP to the WEP a second link margin exchange packet comprising the measured uplink signal strength of the first link margin exchange packet;
    measuring by the WEP a downlink signal strength of the second link margin exchange packet;
    calculating by the WEP an uplink link margin based on the uplink signal strength from the second link margin exchange packet;
    sending by the WEP to the WAP a third link margin exchange packet comprising the measured downlink signal strength of the second link margin exchange packet and the calculated uplink link margin;
    measuring by the WAP the uplink signal strength of the third link margin exchange packet;
    calculating by the WAP a downlink link margin based on the downlink signal strength from the third link margin exchange packet;
    sending by the WAP to the WEP a fourth link margin exchange packet comprising the measured uplink signal strength of the third link margin exchange packet and the calculated downlink link margin; and
    comparing at least one of the uplink link margin and the downlink link margin to a threshold, the WEP joining the WAP when the at least one of the uplink link margin and the downlink link margin is greater than the threshold.

2. The method of claim 1, further comprising repeating measuring the signal strength of a received packet, recalculating the link margin based on the signal strength received in the packet, and sending a link margin exchange packet comprising the measured signal strength and the calculated link margin by the WEP to the WAP and by the WAP to the WEP a predetermined number of times.

3. The method of claim 2, wherein the predetermined number of times is at least 20.

4. The method of claim 1, further comprising providing a visual indication of whether the calculated uplink link margin is above a predetermined uplink link margin threshold, and the calculated downlink link margin is above a predetermined downlink link margin threshold.

5. The method of claim 1, further comprising assigning matching association codes to the WAP and the WEP before the WEP sends the first link margin exchange packet.

6. The method of claim 1, wherein the WEP and the WAP comprise respective computer program products comprising respective computer readable storage mediums containing respective computer code that, when executed by a computer, implement the method for bi-directional link margin establishment in a wireless embedded system.

7. A wireless end point (WEP) comprising:
    a memory; and
    a computer processor, the WEP configured to perform a method comprising:
        send to a wireless access point (WAP) a first link margin exchange packet;
        receive from the WAP a second link margin exchange packet comprising a measured uplink signal strength of the first link margin exchange packet;
        measure a downlink signal strength of the second link margin exchange packet;
        calculate an uplink link margin based on the uplink signal strength from the second link margin exchange packet;
        send to the WAP a third link margin exchange packet comprising the measured downlink signal strength of the second link margin exchange packet and the calculated uplink link margin; and
        compare at least one of the uplink link margin and the downlink link margin to a threshold, the WEP joining the WAP when the at least one of the uplink link margin and the downlink link margin is greater than the threshold.

8. The WEP of claim 7, wherein the WEP is further configured to repeat receiving from the WAP a packet; measuring the downlink signal strength of the received packet, recalculating the uplink link margin based on an uplink signal strength received in the packet, and sending to the WAP a link margin exchange packet comprising the measured downlink signal strength and the calculated uplink link margin a predetermined number of times.

9. The WEP of claim 8, wherein the predetermined number of times is at least 10.

10. The WEP of claim 7, wherein the WEP is further configured to provide a visual indication of whether the calculated uplink link margin is above a predetermined uplink link margin threshold, and the calculated downlink link margin is above a predetermined downlink link margin threshold.

11. The WEP of claim 7, wherein the WEP is further configured to receive an association codes corresponding to an association code of the WAP before the WEP sends the first link margin exchange packet.

12. The WEP of claim 7, wherein the WEP comprises a computer program product comprising a non-transitory computer readable storage medium containing executable computer code.

13. A wireless access point (WAP) comprising:
a memory; and
a computer processor, the WAP configured to perform a method comprising:
receive from a wireless end point (WEP) a first link margin exchange packet;
measure an uplink signal strength of the first link margin exchange packet;
send to the WEP a second link margin exchange packet comprising the measured uplink signal strength of the first link margin exchange packet;
receive from the WEP a third link margin exchange packet comprising a measured downlink signal strength of the second link margin exchange packet and a calculated uplink link margin;
measure the uplink signal strength of the third link margin exchange packet;
calculate a downlink link margin based on the downlink signal strength from the third link margin exchange packet;
send to the WEP a fourth link margin exchange packet comprising the measured uplink signal strength of the third link margin exchange packet and the calculated downlink link margin;
compare at least one of the uplink link margin and the downlink link margin to a threshold, the WAP forming a wireless network with the WEP when the at least one of the uplink link margin and the downlink link margin is greater than the threshold.

14. The WAP of claim 13, wherein the WAP is further configured to repeat receiving from the WEP a packet, measuring the uplink signal strength of the received packet, recalculating the downlink link margin based on a downlink signal strength received in the packet, and sending to the WEP a link margin exchange packet comprising the measured uplink signal strength and the calculated downlink link margin a predetermined number of times.

15. The WAP of claim 14, wherein the predetermined number of times is at least 10.

16. The WAP of claim 13, wherein the WAP is further configured to receive an association codes corresponding to an association code of the WEP before the WEP sends the first link margin exchange packet.

17. The WAP of claim 13, wherein the WAP comprises a computer program product comprising a non-transitory computer readable storage medium containing executable computer code.

* * * * *